United States Patent
Liu

(10) Patent No.: US 9,904,390 B2
(45) Date of Patent: Feb. 27, 2018

(54) DISPLAY DEVICE AND TOUCH DISPLAY PANEL

(71) Applicant: HON HAI PRECISION INDUSTRY CO., LTD., New Taipei (TW)

(72) Inventor: Feng-Hsiang Liu, Tu-Cheng (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 66 days.

(21) Appl. No.: 14/946,070

(22) Filed: Nov. 19, 2015

(65) Prior Publication Data

US 2017/0090628 A1    Mar. 30, 2017

(30) Foreign Application Priority Data

Sep. 30, 2015 (TW) .............................. 104131986 A

(51) Int. Cl.
*G06F 3/041* (2006.01)

(52) U.S. Cl.
CPC .......... *G06F 3/0412* (2013.01); *G06F 3/0416* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0092073 | A1* | 4/2008 | Shih | G06F 8/34 715/765 |
| 2013/0113727 | A1* | 5/2013 | Lin | G06F 1/3262 345/173 |
| 2015/0111544 | A1* | 4/2015 | Zhou | H04M 3/02 455/414.1 |
| 2016/0351141 | A1* | 12/2016 | Liu | G09G 3/3648 |
| 2017/0139534 | A1* | 5/2017 | Hao | G06F 3/0418 |

FOREIGN PATENT DOCUMENTS

TW        M439213 U1    10/2012

* cited by examiner

*Primary Examiner* — Van Chow
(74) *Attorney, Agent, or Firm* — ScienBiziP, P.C.

(57) ABSTRACT

A display device includes a touch display panel, a switch circuit, and a driver chip. The touch display panel includes a touch circuit and a display circuit. The driver chip is coupled to the display circuit for driving the touch display panel to display images. The driver chip is coupled to the touch circuit through the switch circuit, for turning off a touch function of the touch display panel. The disclosure also provides a touch display panel.

6 Claims, 3 Drawing Sheets

DISPLAY DEVICE AND TOUCH DISPLAY PANEL

CROSS-REFERENCE TO RELATED APPLICATIONS

This application claims priority to Taiwan Patent Application No. 104131986 filed on Sep. 30, 2015, the contents of which are incorporated by reference herein.

FIELD

The subject matter herein generally relates to display devices and touch display panels.

BACKGROUND

Conventional touch display panels are generally resistive, capacitive or other types of touch panels, such as an in-cell type touch panel. For the in-cell touch type panel, functions are generally not only displayed but can be also touched.

BRIEF DESCRIPTION OF THE DRAWINGS

Implementations of the present technology will now be described, by way of example only, with reference to the attached figures.

DETAILED DESCRIPTION

Figure 1:
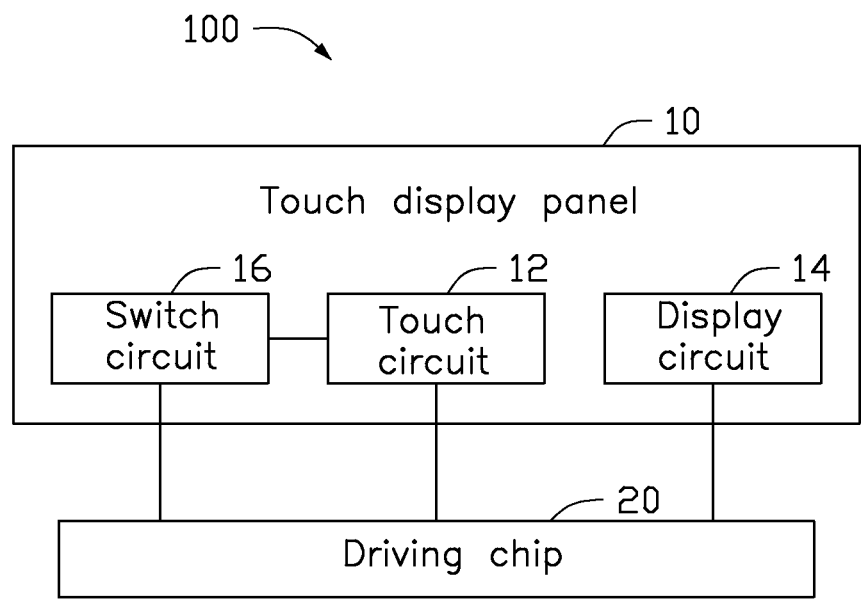
FIG. 1 is a block diagram of an embodiment of a display device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like The present disclosure is described in relation to how an in-cell touch panel cooperates with a display driving chip as a display device with unitary display function. It is understandable that the in-cell touch panel can also cooperate with a touch with display drive integration (TDDI) as a touch display device with touch and display function.

FIG. 1 illustrates an embodiment of a display device 100. The display device 100 can comprise a touch display panel 10 and a driving chip 20. The touch display panel 10 is configured to display images and is configured to sense touch operations. In at least one embodiment, the touch display panel 10 is an in-cell touch panel.

The touch display panel 10 can comprise a touch circuit 12 for sensing touch operations, a display circuit 14 for displaying images, and a switch circuit 16. In at least one embodiment, the touch circuit 12 can comprise touch sensing units, the display circuit 14 can comprise a thin film transistor array for driving a display layer, the display layer can be and not limited to a liquid crystal layer or an organic light emitting display layer. The switch circuit 16 is coupled to the touch circuit 12 for controlling the touch circuit 12 to be turned on or turned off. The driving chip 20 is coupled to the display circuit 14 for driving the touch display panel 10 to display images. The driving chip 20 is also coupled to the touch circuit 12 through the switch circuit 16.

Figure 2:
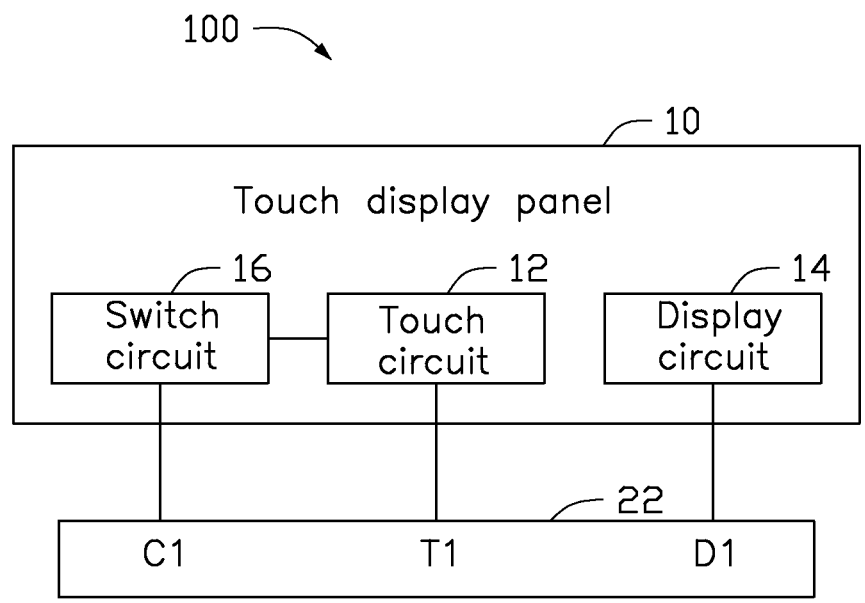
FIG. 2 is a block diagram of the display device of FIG. 1 in a first working mode.

FIG. 2 illustrates an embodiment of the display device 100 in a first working mode. In detail, when the driving chip 20 is a TDDI 22, the TDDI 22 can comprise a display pin D1, a touch pin T1, and a control pin C1 for outputting a first control signal. The display pin D1 of the TDDI 22 is coupled to the display circuit 14 for driving the touch display panel 10 to display images. The touch pin T1 of the TDDI 22 is coupled to the touch circuit 12 for sensing the touch operations on the touch display panel 10. The control pin C1 of the TDDI 22 is coupled to the switch circuit 16. The switch circuit 16 is coupled to the touch circuit 12.

In operation of the TDDI, the first control signal is output from the control pin C1 of the TDDI 22 and is received by the switch circuit 16. The touch circuit 12 is turned on by the switch circuit 16. The touch circuit 12 communicates with the touch pin T1 of the TDDI 22. The touch display panel 10 is driven by the TDDI 22.

Figure 3:
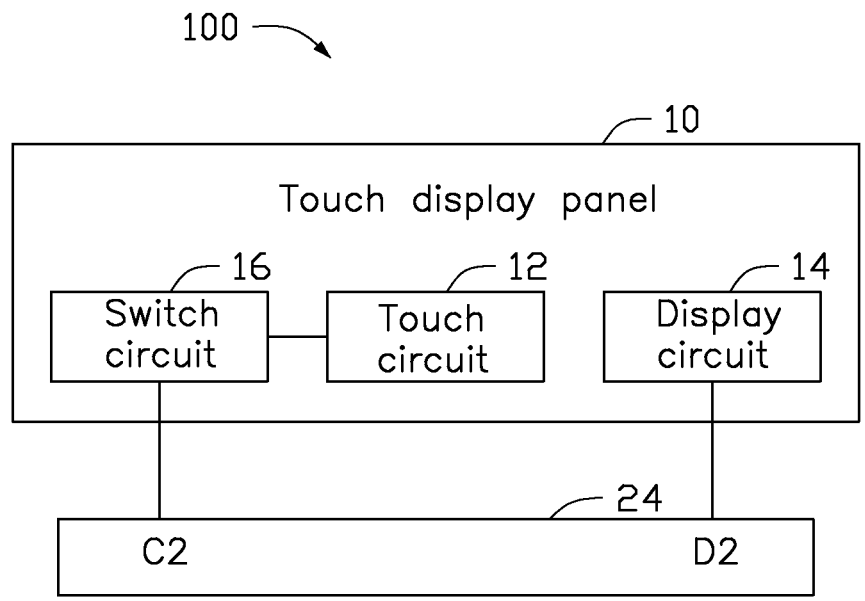
FIG. 3 is a block diagram of the display device of FIG. 1 in a second working mode.

FIG. 3 illustrates an embodiment of the display device 100 in a second working mode. When the driving chip 20 is a display driving chip 24, the display driving chip 24 can comprise a display pin D2 and a control pin C2 for outputting a second control signal. The display pin D2 of the display driving chip 24 is coupled to the display circuit 14 for driving the touch display panel 10 to display images. The control pin C2 of the display driving chip 24 is coupled to the switch circuit 16. The switch circuit 16 is coupled to the touch circuit 12.

In use, the second control signal is output from the control pin C2 of the display driving chip 24 and is received by the switch circuit 16. The touch circuit 12 is turned off by the switch circuit 16 so that touch function of the touch display panel 10 is closed. The touch display panel 10 is driven by the display driving chip 24 with unitary display function. In at least one embodiment, when the driving chip 20 is a display driving chip 24, touch function of the touch display panel 10 is closed without affecting display function of the display device 100.

In at least one embodiment, the control pin C1 is configured as an idle pin or one pin that outputs the first control signal of the TDDI 22. To be the same, the control pin C2 is configured as an idle pin or one pin that outputs the first control signal of the display driving chip 24.

Based on the switch circuit 16 of the display device 100, the touch display panel 10 cooperates with the display driving chip 24 for working with unitary display function. In at least one embodiment, the switch circuit 16 is located in the touch display panel 10. In other embodiments, the switch circuit 16 is not limited in the touch display panel 10, for example, the switch circuit 16 can be located in the driving chip 20 in integration.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A display device comprising:
a touch display panel comprising a touch circuit and a display circuit;
a switch circuit coupled to the touch circuit; and
a display driving chip coupled to the display circuit and configured to drive the touch display panel to display images, the display driving chip further being coupled to the touch circuit and configured to drive the touch display panel to sense touch operations, the switch circuit being coupled between the display driving chip and the touch circuit and configured to control the touch circuit to be turned on or turned off.

2. The display device according to claim 1, wherein the display driving chip comprises a display pin and a control pin, the display pin is coupled to the display circuit of the touch display panel, the control pin is coupled to the switch circuit.

3. The display device according to claim 2, wherein the control pin of the display driving chip is configured to output a control signal to the switch circuit for closing touch function of the touch display panel.

4. The display device according to claim 2, wherein the control pin of the display driving chip is configured as an idle pin of the display driving chip.

5. The display device according to claim 1, wherein the touch display panel is an in-cell touch panel.

6. The display device according to claim 1, wherein the switch circuit is located in the touch display panel.

* * * * *